(12) United States Patent
Omura et al.

(10) Patent No.: US 8,312,617 B2
(45) Date of Patent: Nov. 20, 2012

(54) METHOD OF MANUFACTURING A DISK DRIVE HAVING A BASE MEMBER, BEARING UNIT, DRIVE UNIT AND HUB

(75) Inventors: Yuji Omura, Shizuoka (JP); Kenji Nishihara, Shizuoka (JP)

(73) Assignee: Alphana Technology Co., Ltd., Shizuoka (JP)

( * ) Notice: Subject to any disclaimer, the term of this patent is extended or adjusted under 35 U.S.C. 154(b) by 554 days.

(21) Appl. No.: 12/562,045

(22) Filed: Sep. 17, 2009

(65) Prior Publication Data

US 2011/0063964 A1 Mar. 17, 2011

(51) Int. Cl.
*G11B 5/41* (2006.01)
*B08B 9/30* (2006.01)

(52) U.S. Cl. ............ 29/603.03; 29/603.08; 29/722; 134/25.4; 360/99.21; 360/265.3

(58) Field of Classification Search ........... 29/603.03, 29/603.01, 603.08, 722; 134/25.4, 902; 360/99.21, 360/131, 265.3
See application file for complete search history.

(56) References Cited

U.S. PATENT DOCUMENTS

| 5,557,839 A | * | 9/1996 | Mastache et al. ......... 29/603.03 |
| 5,660,585 A | * | 8/1997 | Swoboda et al. ......... 134/902 X |
| 6,231,676 B1 | * | 5/2001 | Rudd et al. ............... 134/25.4 X |

FOREIGN PATENT DOCUMENTS

| JP | 04330630 A | * 11/1992 | ............ 360/131 |
| JP | 2007124529 | 5/1995 | |

* cited by examiner

*Primary Examiner* — A. Dexter Tugbang
(74) *Attorney, Agent, or Firm* — Fulwider Patton LLP

(57) ABSTRACT

A method of manufacturing a disk drive device including: assembling a subassembly by fixing at least a bearing unit, a drive unit and a hub to a base member in a first clean room; cleaning the subassembly in a second clean room; and sealing the subassembly by a sealing member. The first clean room and the second clean room are communicated with each other by a communicating opening for transferring the subassembly, and an atmospheric pressure in the second clean room is equal to or higher than that in the first clean room.

16 Claims, 9 Drawing Sheets

METHOD OF MANUFACTURING A DISK DRIVE HAVING A BASE MEMBER, BEARING UNIT, DRIVE UNIT AND HUB

BACKGROUND OF THE INVENTION

1. Field of the Invention

The present invention relates to a method of manufacturing a disk drive device and a disk drive device manufactured by the method, and in particular, to a method of manufacturing a disk drive device to which a reduced amount of particles attaches and a disk drive device manufactured by the method.

2. Description of the Related Art

Recently, disk drive devices such as an HDD (Hard Disk Drive) have been required to be small in size and increased in capacity. For example, a disk drive device magnetically storing data rotates a recording disk having recording tracks at a high speed, so that a read/write operation of data is executed while a magnetic head of the device is floating above the recording tracks so as to maintain a slight gap between them. In order for such a disk drive device to be small in size and increased in capacity, a width of the recording track is required to be narrow. As the width of the recording track becomes narrower, the gap between the magnetic head and the recording disk is required to be further smaller. For example, the gap between the magnetic head and the recording disk is required to be as extremely small as 10 nm or less.

In order for the disk drive device to be small in size, a magnetoresistive effect element (hereinafter, referred to as an MR element) is used for the magnetic head. On the other hand, the use of the MR element in such a small gap causes a fear that a thermal asperity failure (hereinafter, referred to as a TA failure) or a head crash failure may occur in the magnetic head. Specifically, the TA failure means that: minor foreign substances on the surface of the recording disk are in contact with the MR element while the magnetic head is floating to trace the recording tracks, and therefore heat is momentarily caused in the MR element due to kinetic energy of the foreign substances; and a resistance value of the MR element is momentarily varied due to momentary heating or cooling of the MR element, resulting in superimposition of the varied resistance value on a reproduced signal as a noise, and interference with correct reading of the reproduced signal.

As a result of intensive study by the present inventor, it has been known that the TA failure occurs due to the fact that foreign substances having sizes of 0.1 μm to approximately several μm (hereinafter, referred to as "particles") that attach to a disk drive device, then attach to the surface of the recording disk due to a vibration or an air flow. Herein, Japanese patent Application Publication No. Hei 7-124529 discloses a cleaning apparatus that cleans various parts such as a base.

Even when the base is cleaned, however, particles possibly attach thereto in a step of fixing a bearing unit and a hub to the base. For example, in the first case, particles attaching to assembly equipment, tools or tips of workers' hands possibly transfer to the disk drive device. In the second case, when an adhesive is used for fixing the bearing unit and the hub to the base, a component included in the adhesive may fly in all directions and attach to the surfaces of the bearing unit and the hub, causing particles attaching thereto. In the third case, when soldering and welding, for example, are to be used for connection of electric wirings in the drive unit, etc., particles possibly fly in all directions and attach to the surfaces of the base, the drive unit and the hub while soldering and welding are being performed, causing particles attaching thereto.

As stated above, the particles attaching thereto while fixing parts, cannot be removed by a conventional method of manufacturing a disk drive device, and hence a cleanness level inside a general disk drive device is low. Remaining of many particles causes a high incidence of the TA failure when the gap in which the magnetic head floats becomes small, resulting in interference with miniaturization and increased capacity of the disk drive device.

SUMMARY OF THE INVENTION

The present invention has been made in view of the aforementioned circumstances, and a purpose of the invention is to provide a technique in which a cleanness level inside a disk drive device is improved such that an incidence of a TA failure can be maintained at a low level in the case where a gap between a magnetic head and a recording disk is small while the magnetic head is tracing the recording disk.

An embodiment of the present invention relates to a method of manufacturing a disk drive device. The method of manufacturing a disk drive device includes: assembling a subassembly by fixing at least a bearing unit, a drive unit and a hub to a base member in a first clean room; cleaning the subassembly in a second clean room; and sealing the subassembly by a sealing member, wherein the first clean room and the second clean room are communicated with each other by a communicating opening for transferring the subassembly, and wherein an atmospheric pressure in the second clean room is equal to or higher than that in the first clean room.

According to the embodiment, the number of particles attaching to the disk drive device while the device is being manufactured, can be reduced.

Another embodiment of the present invention relates to a disk drive device. The disk drive device is manufactured by a method of manufacturing a disk drive device that includes: assembling a subassembly by fixing at least a bearing unit, a drive unit and a hub to a base member in a first clean room; cleaning the subassembly in a second clean room; and sealing the subassembly by a sealing member, wherein a communicating opening for transferring the subassembly is provided between the first clean room and the second clean room, and wherein an atmospheric pressure in the second clean room is equal to or higher than that in the first clean room.

According to the embodiment, a disk drive device having the reduced number of particles attaching thereto while the device is being manufactured, can be provided.

BRIEF DESCRIPTION OF THE DRAWINGS

Embodiments will now be described, by way of example only, with reference to the accompanying drawings which are meant to be exemplary, not limiting, and wherein like elements are numbered alike in the Figures enumerated below.

DETAILED DESCRIPTION OF THE INVENTION

Figure 1:
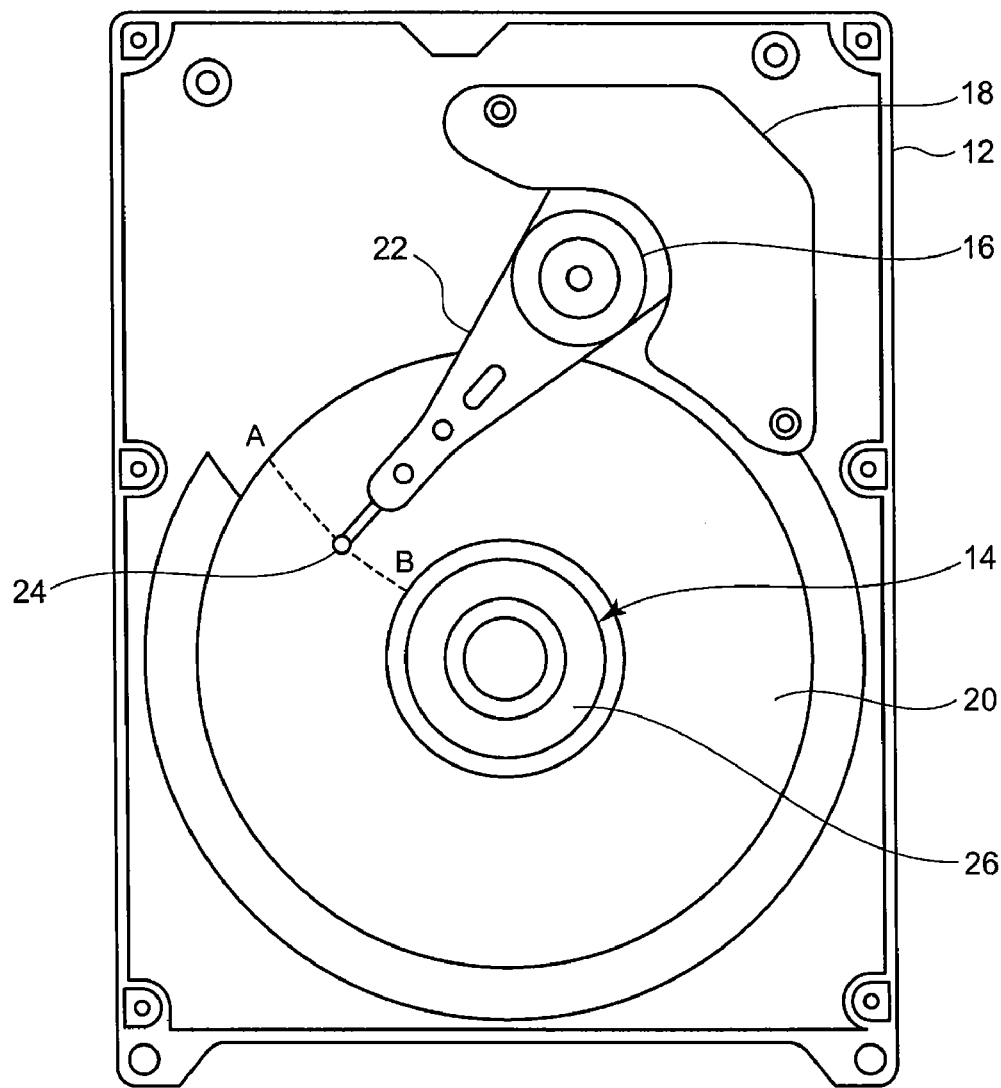
FIG. 1 is a top view of a disk drive device assembled by using a method of manufacturing a disk drive device according to an embodiment.

The invention will now be described by reference to the preferred embodiments. This does not intend to limit the scope of the present invention, but to exemplify the invention. FIG. 1 is a top view of a disk drive device 10 assembled by using a method of manufacturing a disk drive device 10 according to an embodiment. FIG. 1 illustrates a state where a top cover is removed to expose an internal structure. In the drawing, an HDD is illustrated as an example of the disk drive device 10.

The disk drive device 10 comprises a base member 12, a drive unit 14, an arm bearing unit 16, a voice coil motor 18, a recording disk 20, a swing arm 22, a magnetic head 24 and a hub 26. The drive unit 14, the arm bearing unit 16 and the voice coil motor 18, etc., are mounted on the top surface of the base member 12. The recording disk 20 can magnetically store data. The recording disk 20 is mounted on the hub 26.

The drive unit 14 supports the hub 26 to rotatably drive the recording disk 20. The drive unit 14 may be a spindle motor. The arm bearing unit 16 supports the swing arm 22 such that the swing arm swings freely in all directions. The voice coil motor 18 swings the swing arm 22 in accordance with control data from outside. The magnetic head 24 is fixed to the tip of the swing arm 22. The magnetic head 24 moves within a movable range AB.

When the disk drive device 10 is an operating state, the magnetic head 24 moves above the surface of the recording disk 20 within the movable range AB so as to maintain a slight gap between the magnetic head 24 and the surface thereof in accordance with a swing of the swing arm 22, so that data is read/written. It is noted that point A corresponds to the outermost circumferential position of the recording tracks of the recording disk 20, and point B to the innermost circumferential position thereof. When the disk drive device 10 is in a halting state, the swing arm 22 may move to a waiting position provided outside in the radial direction of the recording disk 20.

Figure 2:
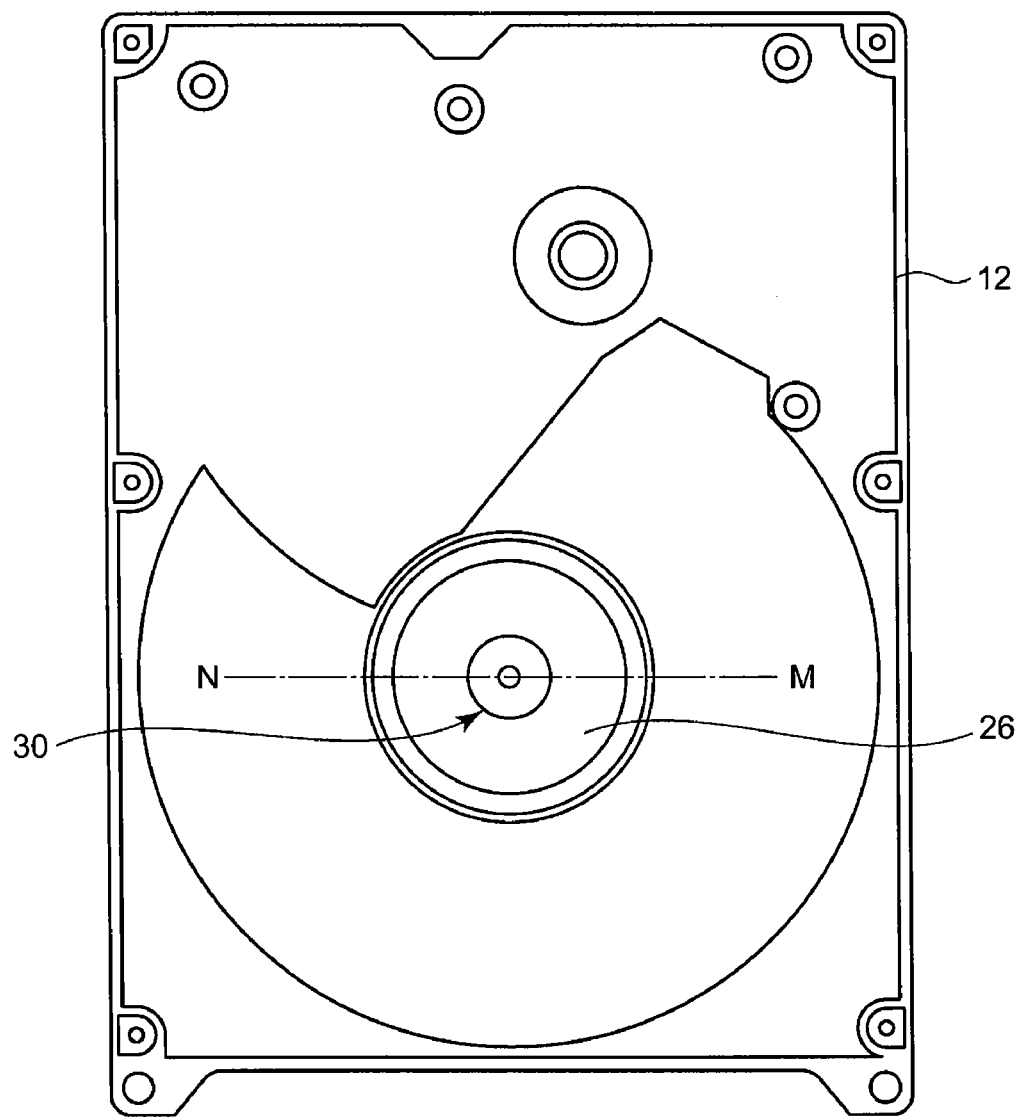
FIG. 2 is a top view illustrating a subassembly of the disk drive device according to the embodiment.

FIG. 2 is a top view illustrating a subassembly 28 of the disk drive device 10 according to the embodiment. The subassembly 28 is to be cleaned. The subassembly 28 is the disk drive device 10 in a state where the bearing unit 30, the hub 26 and the like are fixed to the base member 12, but the voice coil motor 18, the swing arm 22 and the like are not. Thereafter, the disk drive device 10 is completed by fixing the recording disk 20, the magnetic head 24, the swing arm 22, the arm bearing unit 16, the voice coil motor 18 and the top cover to the subassembly 28 that has been cleaned.

Figure 3:
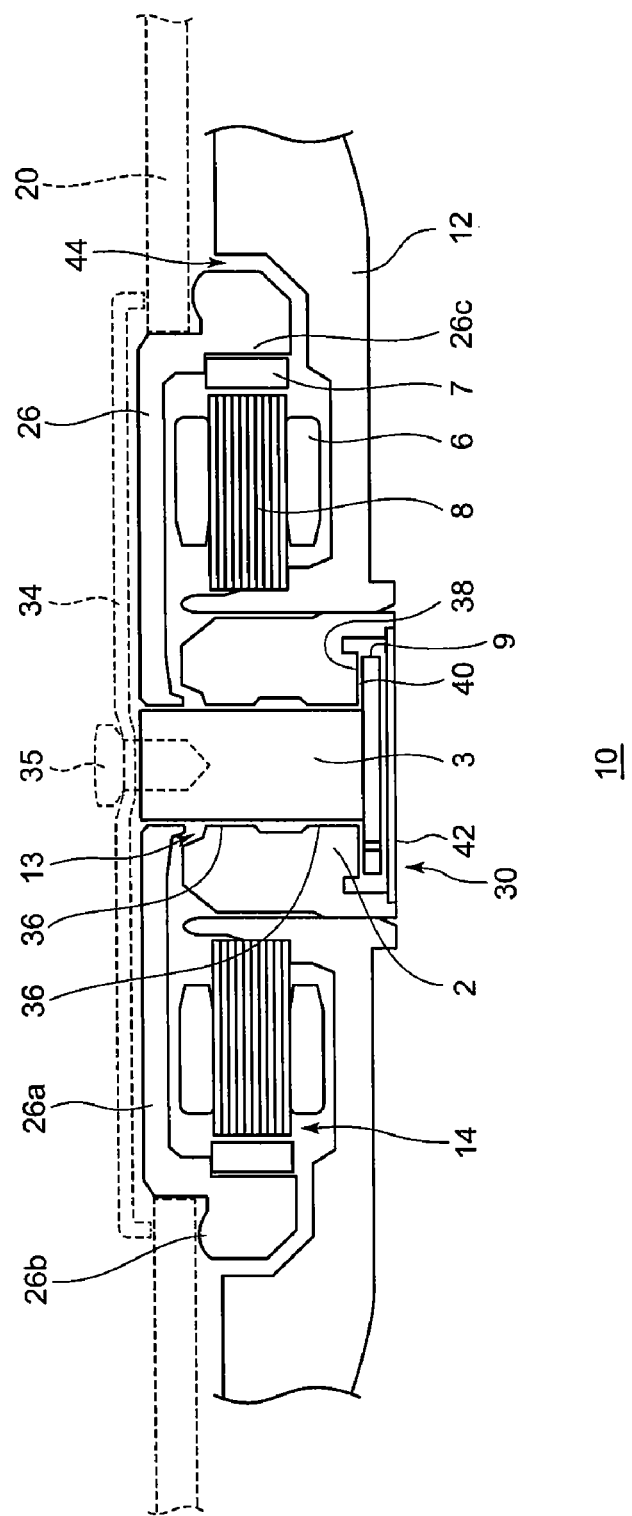
FIG. 3 is a cross-sectional view illustrating part of the disk drive device according to the embodiment.

FIG. 3 is a cross-sectional view illustrating part of the disk drive device 10 according to the embodiment. FIG. 3 illustrates the cross-section taken along a cut-line shown by M-N in FIG. 2. FIG. 3 illustrates a structure of a shaft-rotation-type disk drive device 10 in which the hub 26 and a shaft 3 rotate integrally. The disk drive device 10 further comprises a bearing unit 30. The disk drive device 10 includes a fixed body portion and a rotating body portion. The members illustrated by dashed lines are not fixed to the subassembly 28.

The fixed body portion includes the base member 12, a stator core 8, a coil 6, a sleeve 2 and a counter plate 42. The approximate center of the base member 12 is formed with a cylinder portion protruding upwards. The base member 12 can be produced by cutting a base material fabricated with, for example, the aluminum die casting. The base member 12 rotatably supports the hub 26 through the bearing unit 30.

The sleeve 2 is formed into a cylindrical shape and formed of a metal material or a resin material having conductivity. The sleeve 2 is fixed to the internal surface of the cylinder portion of the base member 12. The disk-shaped counter plate 42 is firmly fixed to one end of the sleeve 2 such that lubricant does not leak to the outside.

The stator core 8 includes a circular portion and a plurality of salient poles that are extended therefrom to outside in the radial direction. The stator core 8 is fixed to the external surface of the cylinder portion of the base member 12. The stator core 8 is formed by performing insulation coating such as electro-deposition coating and powder coating on the surface thereof after a plurality of magnetic plates such as ferrosilicon plates are laminated. The stator core 8 is a ring-shaped member having the plurality of salient poles protruding outwards in the radial direction. The three-phase coil 6 is formed by each of the salient poles of the stator core 8 being wounded with wiring. The terminal of the wiring forming the coil 6 is electrically connected to an FPC (Flexible Printed Circuits) arranged on the bottom surface of the base member 12.

The rotating body portion includes the hub 26, the shaft 3, a flange 9 and a magnet 7. The hub 26 is a member having an approximate cup shape, and the recording disk 20 is mounted thereon.

The hub 26 is formed by machining, such as pressing and cutting, a steel sheet having soft magnetism. The hub 26 has a disk portion 26a concentric with a central hole and an outward extension portion 26b extending outwards in the radial direction from the lower end of the outer diameter of the disk portion 26a. A circular gap 44 opened outwards is formed between the base member 12 and the hub 26.

A donut-shaped clamper 34 is fixed to the hub 26 with a screw 35. The donut-shaped recording disk 20 is mounted on the outward extension portion 26b. On the recording disk 20 thus mounted, the clamper 34 is mounted, and thereby the recording disk 20 being fixed. Namely, the clamper 34 and the screw 35 function as locking means for the recording disk 20.

The ring-shaped magnet 7 is fixed to the internal surface 26c of the outward extension portion 26b. The magnet 7 is formed of, for example, an Ne—Fe—B (Neodymium—Ferrum—Boron) material, the surface of which is rustproofing such as electro-deposition coating and splay coating is performed. For example, the inner circumferential surface of the magnet 7 is magnetized in twelve poles.

The shaft 3 is inserted into the sleeve 2. The upper end portion of the shaft 3 is fixed to the central hole of the hub 26, while the lower end portion thereof is fixed to the disk-shaped flange 9. The flange 9 is arranged in a flange-housing space formed by the sleeve 2 and the counter plate 42.

The bearing unit 30 includes the shaft 3, the flange 9, the sleeve 2 and the counter plate 42. The bearing unit 30 has a radial dynamic pressure bearing unit, a thrust dynamic pressure bearing unit and a capillary seal portion 13. The radial dynamic pressure bearing unit has a radial dynamic pressure groove 36 and a lubricant. The thrust dynamic pressure bearing unit has a thrust dynamic pressure groove 40 and a lubricant. The radial dynamic pressure groove 36 is formed into a herringborn shape, and formed on the inner circumferential surface of the sleeve 2 so as to be vertically apart. The thrust dynamic pressure groove 40 is formed into a herringborn shape or a spiral shape, and formed on the surface of the flange 9 opposing to the bottom face 38 of the sleeve 2 and the surface thereof opposing to the counter plate 42.

The capillary seal portion 13 is provided on the top open end side of the sleeve 2, and formed such that the gap between the inner circumferential surface of the sleeve 2 and the outer circumferential surface of the shaft 3 gradually becomes larger toward the top open end. A lubricant such as oil is infused in a space defined by the radial dynamic pressure groove 36, the thrust dynamic pressure groove 40, and the capillary seal portion 13 and the surface opposing thereto. The capillary seal portion 13 prevents leaking of the lubricant with capillarity.

With the rotation of the shaft 3, the radial dynamic pressure groove 36 generates a radial dynamic pressure in the lubricant, thereby supporting the rotating body portion in the radial direction. Also with the rotation of the flange 9, the thrust dynamic pressure groove 40 generates a thrust dynamic pressure in the lubricant, thereby supporting the rotating body portion in the thrust direction.

The drive unit 14 includes the stator core 8, the coil 6 and the magnet 7. When the coil 6 is powered with a three-phase drive current by a predetermined drive circuit, the coil 6 generates a magnetic field for rotation. Rotation driving force is generated by interaction between the driving poles of the magnet 7 and the magnetic field for rotation generated by the coil 6, so that the rotating body portion is rotated.

Figure 4:
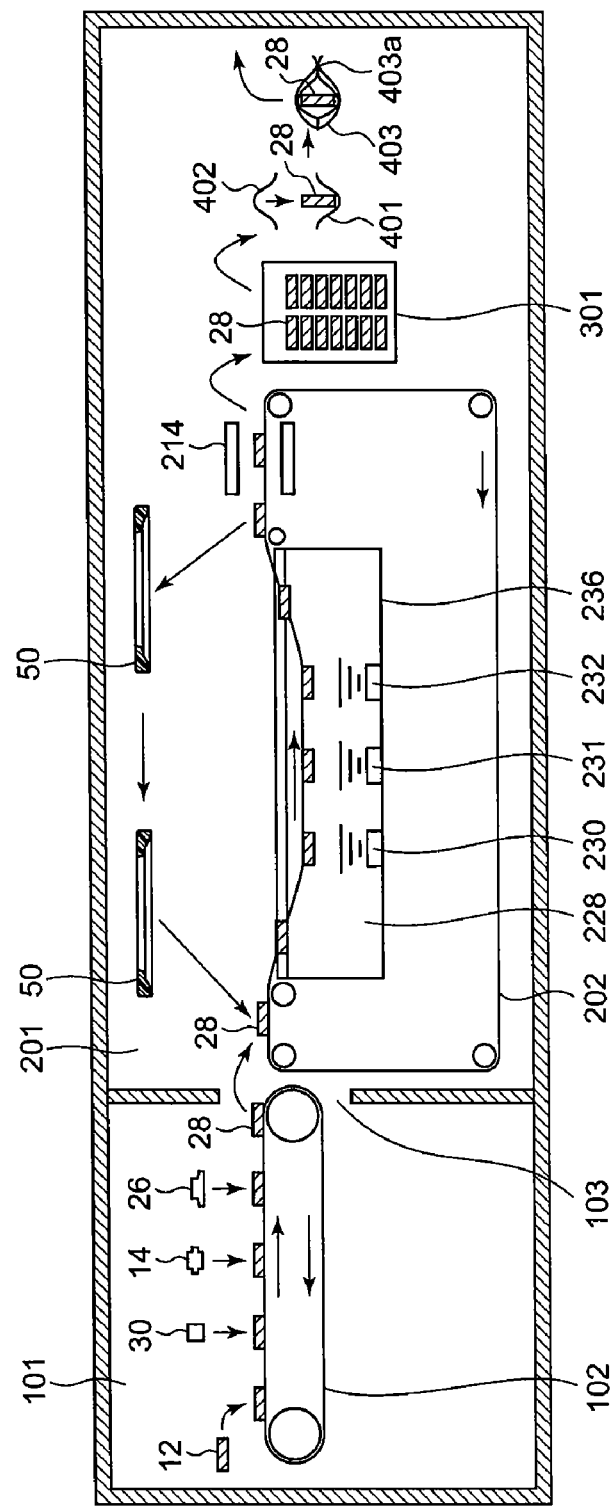
FIG. 4 is a view illustrating each step of the method of manufacturing the disk drive device according to the embodiment.

FIG. 4 is a view illustrating each step of the manufacturing method of the disk drive device 10 according to the embodiment. In FIG. 4, the steps advance in the direction from left to right in the drawing. The manufacturing method of the disk drive device 10 includes: assembling the subassembly 28 by fixing at least the bearing unit 30, the drive unit 14 and the hub to the base member 12 in a first clean room 101; cleaning the subassembly 28 in a second clean room 201; and sealing the subassembly 28 by a sealing member.

In the embodiment, the assembling is performed in the first clean room 101. The cleaning is performed in the second clean room 201. Each clean room is filled with cleaned air. The first clean room 101 and the second clean room 201 may be positively pressurized relative to outside atmosphere. The first clean room 101 and the second clean room 201 are communicated with each other by a communicating opening 103. The subassembly 28 is transferred from the first clean room 101 to the second clean room 201 through the communicating opening 103.

An atmospheric pressure in the second clean room 201 is equal to or higher than that in the first clean room 101. The atmospheric pressure in the second clean room 201 is controlled to be a positive pressure relative to that in the first clean room 101. Particles occurring in the assembling possibly float in the first clean room 101. A probability that the particles in the first clean room 101 may enter the second clean room 201 is reduced by setting the atmospheric pressure in the second clean room 201 to a positive pressure.

A conveying apparatus 102 is provided in the first clean room 101. The conveying apparatus 102 is, for example, a belt conveyor. The conveying apparatus 102 illustrated in FIG. 4 conveys the base member 12, etc., at a predetermined speed by clockwise moving a conveyance belt thereof. The base member 12, the bearing unit 30, the hub 26 and the drive unit 14, etc., are placed into the first clean room 101 from a carry-in port (not illustrated) thereof.

At first in the assembling, the bearing unit 30, the drive unit 14 and the hub 26 are sequentially fixed to the base member 12 such that the subassembly 28 is assembled. When soldering or adhesion is used in the stage, inorganic particles due to the soldering and hydrocarbon particles due to the adhesion possibly attach to the subassembly 28. Subsequently, the subassembly 28 is conveyed into the second clean room 201 by the conveying apparatus 102. The subassembly 28 is transferred from the conveying apparatus 102 to a conveying apparatus 202.

In the cleaning according to the embodiment, the conveying apparatus 202 is used. The conveying apparatus 202 is, for example, a belt conveyor. The conveying apparatus 202 illustrated in FIG. 4 conveys the subassembly 28 at a predetermined speed by clockwise moving a conveyance belt thereof. Also in the cleaning, a cleaning tank, which is filled with a predetermined amount of purified water as a cleaning solution 228, is used. Cleaning with the purified water is advantageous in terms of not requiring a rinse after the cleaning. Besides the purified water, a cleaning solution 228 including a surfactant or a hydrocarbon cleaning solution 228 may be used. These cleaning solutions are advantageous in terms of excellent detergency for particles.

The conveying apparatus 202 inverts the subassembly 28 such that the base member 12 is located upwards and the hub 26 is downwards. Thereafter, the subassembly 28 is conveyed while the bottom surface of the base member 12 being kept horizontal (hereinafter, referred to as an inverted posture), and is placed into the cleaning solution 228. The subassembly 28 is placed into the cleaning solution 228 in a pasture in which the bottom surface of the base member 12 is in an approximately horizon posture, i.e., to keep the inverted pasture. In this case, an amount of the cleaning solution 228 entering the inside of the subassembly 28 from the gap 44 between the base member 12 and the hub 26, can be reduced. The subassembly 28 is conveyed through the cleaning tank 226 toward right side of the drawing, while being cleaned in the cleaning solution 228. Thereby, the particles attaching to the subassembly 28 in the assembling can be removed.

If the cleaning solution remains on the surface of the subassembly 28 after the cleaning, the remaining cleaning solution sometimes reacts with the hub 26 and the base member 12, causing the surfaces thereof to be modified. The modified surfaces of the hub 26 and the base member 12 possibly detach therefrom to become particles, causing a TA failure. Accordingly, the remaining cleaning solution is reduced by providing water-removing and drying after the cleaning.

In the embodiment, the water-removing is provided before the drying. The conveying apparatus 202 conveys the subassembly 28 into the water-removing apparatus 214. In the water-removing, water attaching to the surface of the subassembly 28 is removed by blowing warm air against the subassembly 28 with the water-removing apparatus 214. A drying period required in the drying can be shortened by removing the water in the water-removing, leading to improved productivity.

The subassembly 28 is then transferred to a high-temperature tank 301 from the water-removing apparatus 214. In the drying, the high-temperature tank 301 is used. The high-temperature tank 301 is filled with cleaned air, temperature of which is maintained between 60° C. to 120° C. The subassembly 28 is placed in the high-temperature tank 301 for 60 to 120 minutes so as to be dried while being heated. The remaining cleaning solution 228 can be efficiently removed by heating and drying.

The remaining cleaning solution 228 is removed by setting the period when the subassembly 28 is being placed in the high-temperature tank 301, to 60 minutes or longer, so that the surface of the subassembly 28 is hardly modified. Also, by setting the period when the subassembly 28 is being placed in the high-temperature tank 301, to 120 minutes or shorter, deterioration in working efficiency can be suppressed. The drying period can be shortened by maintaining the temperature inside the high-temperature tank 301 at a temperature equal to or higher than 60° C., and evaporation of the lubricant can be suppressed by maintaining the temperature thereof at a temperature equal to or lower than 120° C.

Subsequently, the particles floating in the air possibly reattach to the subassembly 28 after the drying. Also, the water in the air possibly reacts with the hub 26 and the base member 12 to modify the surfaces thereof. Therefore, the manufacturing method of the disk drive device 10 according to the embodiment includes sealing the subassembly 28 with cleaned air such that possibilities that the particles may reattach thereto and the surfaces thereof be modified are reduced.

The subassembly 28 after the drying is transferred to the sealing. A sealing member includes two sheets of trays and a bag having predetermined air-tightness. In the sealing, the subassembly 28 is sandwiched by the trays 401 and 402 such that the entire thereof is enclosed. The sandwiched subassembly 28 is enveloped by a bag 403. The air in the bag 403 is then evacuated and the inlet 403a of the bag 403 is closed.

When the trays are formed of, for example, PET (polyethylene terephthalate), the trays become less hard than the hub 26 and the base member 12, leading to an advantage that the subassembly 28 is hardly damaged by the trays. The sealing member formed of, for example, PET, has an advantage that the predetermined air-tightness is easily secured. For example, a method of closing the inlet 403a of the bag 403 by thermo compression bonding has an advantage that particles hardly occur when closing the bag. The aforementioned predetermined air-tightness means that, assuming that an initial internal atmospheric pressure in the bag 403 is 0.8 (atm), the internal atmospheric pressure thereof becomes equal to or lower than 0.9 (atm) after leaving the bag 403 in the air for 24 hours.

After the sealing, the subassembly 28 is discharged from a discharge port (not illustrated). The subassembly 28 is then transferred to the final assembling, where the sealing member is removed in a third clean room (not illustrated) and the recording disk 20, the magnetic head 24, the swing arm 22, the arm bearing unit 16 and the voice coil motor 18 are fixed. Thereafter, the top cover covering the entire thereof is fixed in a cleaned space, completing the disk drive device 10.

The subassembly 28 possibly causes a slight void in the cleaning. In particular, when cleaning the subassembly 28 with an ultrasonic wave, a void communicating the upper and the lower surfaces thereof possibly occurs in the subassembly 28. For example, the void possibly occurs in: a place where the sleeve 2 is fitted to the central hole of the base member 12; a wire hole of the base member 12 for inserting the wiring of the coil 6 therethrough; and the like. If the subassembly 28 has a void from which even small amount of air can come in and out, non-cleaned air including particles enters the inside of the disk drive device 10 after being assembled. If the particles enter the inside thereof, there is a challenge that the TA failure may occur. To deal with the challenge, the manufacturing method according to the invention may include confirming whether the subassembly 28 has a void. With this, the subassembly 28 having a void can be determined to be a defective product, leading to reduced production of the subassemblies 28 having a void. The confirming is executed after the drying.

For example, a predetermined space is defined with the subassembly 28 and a space-forming member, and then the predetermined space is filled with cleaned air having a pressure higher than atmospheric pressure. Thereafter, it is confirmed whether the subassembly 28 has a void based on the standard in which a drop rate of the pressure in the predetermined space is set forth in advance. This method is advantageous in terms of particles hardly occurring.

In the cleaning, the wiring of the coil 6 of the subassembly 28 is possibly disconnected. In particular, when cleaning the subassembly 28 with an ultrasonic wave, the end portion of the wiring of the coil 6 is possibly disconnected by resonance with the ultrasonic wave. When the wiring of the coil 6 is disconnected, rotation becomes unstable and the disk drive device 10 sometimes does not work at worst. Therefore, the manufacturing method according to the invention may include confirming a resistance value of the coil 6 between the drying and the sealing. Thereby, disconnection of the wiring of the coil 6 can be detected.

For example, the terminal of the FPC of the subassembly 28 is connected to a drive circuit for confirming a resistance value of the coil 6. The drive circuit is then driven so as to confirm the resistance value of the coil 6 based on the standard in which a current occurring at the time of rotation and a situation of current variation are set forth in advance. This method is advantageous in terms of particles hardly occurring.

Among the particles attaching to the subassembly 28, relatively large particles sometimes are not easily removed. To deal with the challenge, the cleaning may include cleaning the subassembly 28 by blowing a mixture of purified water and air against the subassembly 28. As a result, large kinetic energy for removing the particles can be provided, allowing the particles having a large mass to be removed.

Kinetic energy by a purified water particle can be calculated by multiplication of a mass of the purified water particle with the square of a speed thereof, and hence the kinetic energy can be controlled by adjusting a particle size and a blowing speed of the purified water, i.e., a compaction degree of air. From experiments, it has been understood that particles having a relatively mass can be removed by cleaning the subassembly 28 with the particle size of the purified water particle being 20 to 80 μm, and with the blowing speed thereof being 20 to 80 m/s.

However, when cleaning the subassembly 28 with purified water, there is a challenge that a period for removing the liquid is required to be longer than that in the case where a volatile cleaning solution is used. To deal with the challenge, the cleaning may include cleaning the subassembly 28 by blowing cleaned air thereagainst while applying vibration or impact to the subassembly 28. For example, when applying vibration and impact to the subassembly 28, the particles attaching thereto float such that the particles thus floating detach from the subassembly 28 by blowing the cleaned air thereagainst. The subassembly 28 can be cleaned by evacuating the particles that detach from the subassembly 28, by using an aspirator. In this case, efforts to remove the water is no longer required after the cleaning.

In the cleaning in which the subassembly 28 is cleaned by blowing the cleaned air, magnitudes of the vibration and impact applied thereto are determined to be a level at which the function of the subassembly 28 is not impaired. This method is advantageous in terms of the function of the disk drive device not being deteriorated. From experiments, a conclusion has been made that an impact having a magnitude equal to or smaller than 200 G does not impair the function of the subassembly 28, and an impact having a magnitude equal to or larger than 100 G can effectively float the particles. The subassembly 28 may be cleaned by blowing cleaned air against the subassembly 28 in the inverted posture. This method is advantageous in terms of the floating particles hardly reattaching to the surface of the subassembly 28 sealed by the top cover. The cleaned air thus blown may be ionized air. With this, static electricity charging the subassembly 28 can be reduced, allowing reattachment of the particles to be suppressed.

When cleaning the subassembly 28 in the cleaning solution 228, the cleaning solution 228 possibly enters the inside of the subassembly 28 from the gap 44 between the base member 12 and the hub 26. The inside of the subassembly 28 means a space in which the drive unit 14 is arranged, and which is enclosed by the hub 26 and the base member 12. There is a challenge that removing the cleaning solution 228 entering the inside of the subassembly 28 takes a long time and makes the working efficiency deteriorated. To deal with the challenge, the manufacturing method according to the invention may include fixing a removable cover member 50 to the gap 44 between the base member 12 and the hub 26 before the cleaning. As a result, entrance of the cleaning solution 228 into the inside of the subassembly 28 can be suppressed.

The cover member 50 is removed from the subassembly 28 between the cleaning and the water-removing. The cover member 50 thus removed is reused. Areas of the base member 12 and the hub 26 covered with the cover member 50 are not cleaned. Therefore, the cover member 50 may be shaped so as not to cover the outer circumferential cylinder portion of the hub 26. As a result, the area of the hub 26 covered with the cover member 50 can be small. The outer circumferential cylinder portion of the hub 26 is a place to which the inner circumference of the central hole of the recording disk 20 is fitted.

Figure 5A:
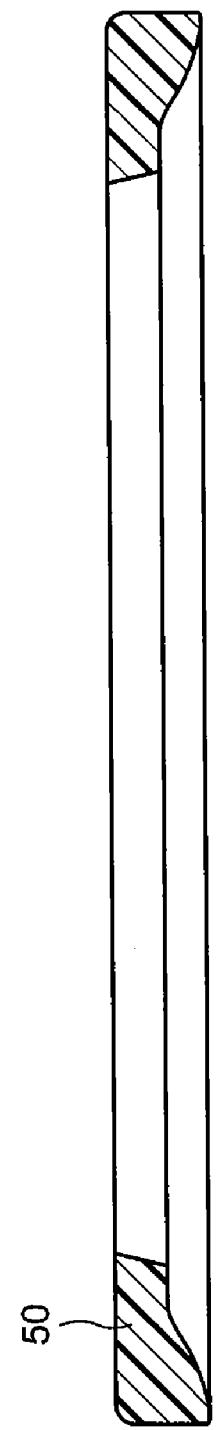
FIG. 5A is a cross-sectional view of a cover member according to the embodiment.
Figure 5B:
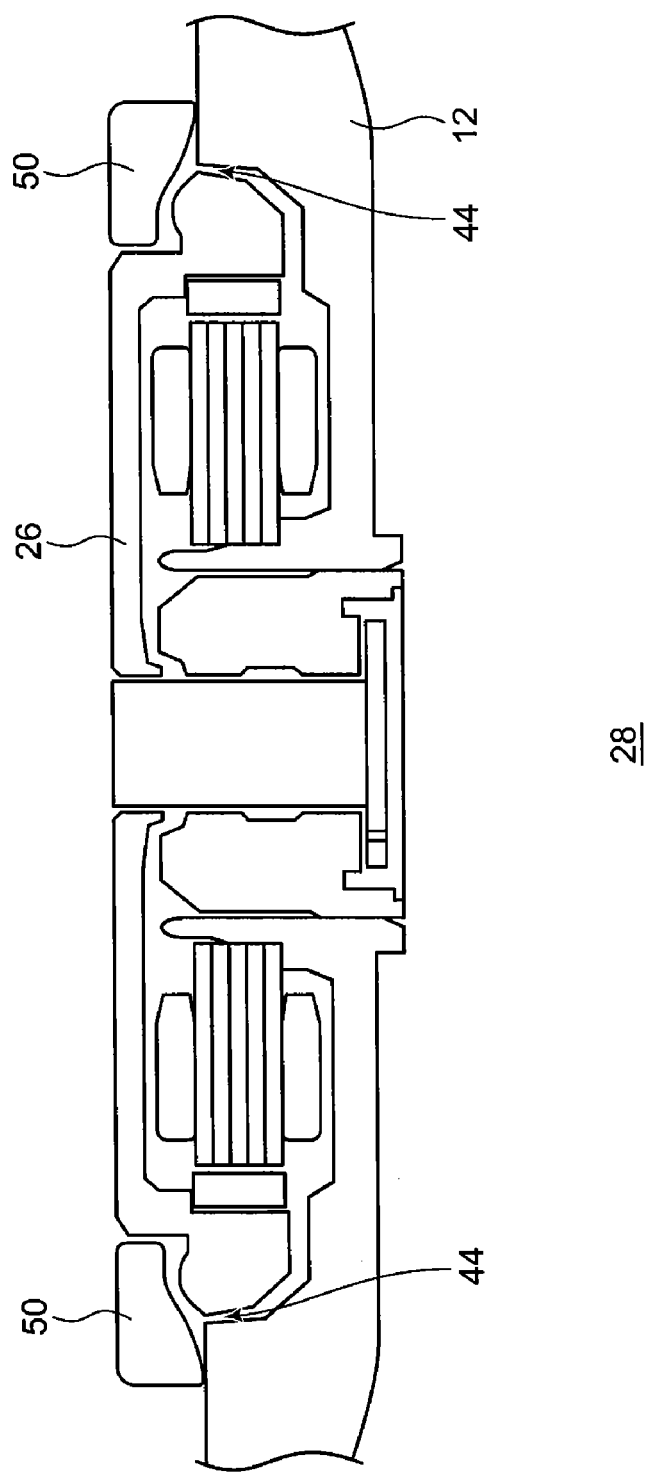
FIG. 5B is a cross-sectional view illustrating a state where the cover member according to the embodiment is fixed to the subassembly.

FIG. 5A is a cross-sectional view of the cover member 50 according to the embodiment. FIG. 5B is a cross-sectional view illustrating a state where the cover member 50 according to the embodiment is fixed to the subassembly 28. The cover member 50 is formed into a circular shape in accordance with the gap 44. The cover member 50 may be made of a metal material, plastic resin material or rubber material. The cover member 50 made of a rubber material is not expensive and easy to be processed.

Subsequently, when fixing the cover member 50, the base member 12 and the hub 26 are possibly damaged. There is a challenge that working efficiency becomes deteriorated when working slowly so as not to damage them. To deal with the challenge, the cover member 50 may be formed of a plastic resin material. The resin material has a lower hardness than the metal forming the base member 12 and the hub 26, and hence a possibility of damaging the base member 12 and the hub 26 can be reduced by forming the cover member 50 with a resin material.

There is a challenge that the cover member 50 may be detached while being cleaned. To deal with the challenge, the cover member 50 may be formed of an elastic body. For example, the cover member 50 is formed of a rubber-like material having elasticity. A convex row is provided on the inner circumference of the cover member 50 surrounding the hub 26. Because the convex row of the cover member 50 is in contact with the hub 26, the challenge that the cover member 50 may be detached while being cleaned can be reduced.

There is the next challenge that an amount of the cleaning solution 228 entering the inside of the subassembly 28 is desired to be reduced to a lower level. To deal with the challenge, in the fixing in which the cover member 50 is fixed, a liquid resin 60 may be applied to the gap 44 between the base member 12 and the hub 26, and thereafter be cured.

Figure 6:
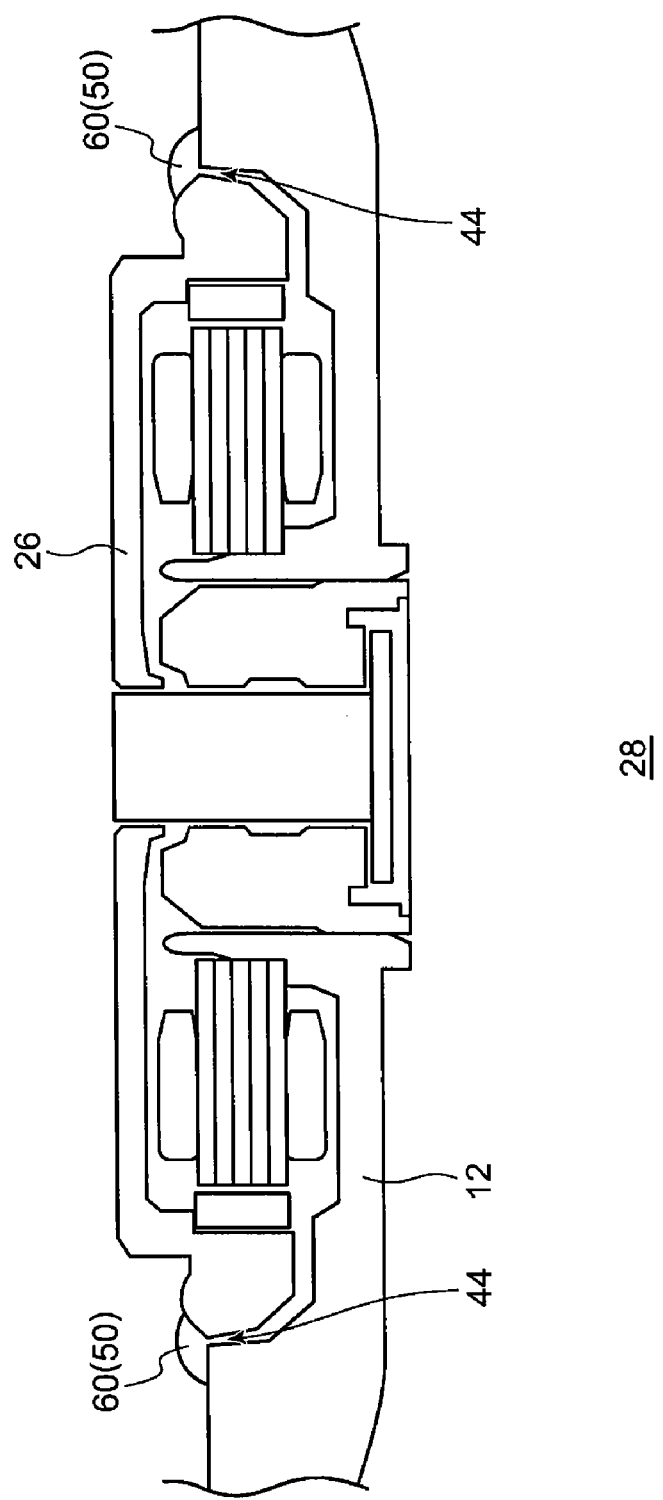
FIG. 6 is a cross-sectional view illustrating a state where a variation of the cover member according to the embodiment is fixed to the subassembly.

FIG. 6 is a cross-sectional view illustrating a state where a variation of the cover member 50 according to the embodiment is fixed to the subassembly 28. FIG. 6 illustrates a state where a liquid resin 60 is applied to the gap 44 and thereafter is cured.

The liquid resin 60 is at first applied to the gap 44, thereby clogging the gap 44. The liquid resin 60 is heated to approximately 70° C. to be cured. The resin 60 thus cured becomes the cover member 50, which is to be removed after the cleaning. Thereby, when the subassembly 28 is placed in the cleaning solution 228, the amount of the cleaning solution 228 entering the inside of the subassembly 28 can be reduced to a lower level.

If curing of the resin 60 takes a long time, the liquid resin 60 possibly spreads before being cured. There is a challenge that, if the resin 60 spreads, efforts for removing the resin 60 are required. To deal with the challenge, the liquid resin 60 may be cured with ultraviolet irradiation. A so-called ultraviolet curable rein can be cured in a shorter time by ultraviolet irradiation than that by heating. As a result, the spread of the liquid resin 60 can be suppressed.

There is the next challenge that the particles are desired to be efficiently removed in order to improve working efficiency. To deal with the challenge, in the cleaning, the subassembly 28 may be cleaned by ultrasonic wave irradiation. As a result, the particles can be efficiently removed by a cavitation effect of the ultrasonic waves. With a frequency of the ultrasonic wave being set to 40 KHz or higher, erosion of the subassembly 28 by an excessive cavitation effect can be reduced.

The present inventor has understood that a major cause of the TA failure is the particles attaching to the surfaces of the hub 26 and the base member 12, the surfaces being on the side sealed by the top cover. Therefore, an ultrasonic generator may be arranged at a position opposing to the hub 26 of the subassembly 28 while being cleaned. As illustrated in FIG. 4, the ultrasonic generators 230, 231 and 232 are arranged near the bottom of the cleaning tank 226 so as to output ultrasonic waves upwards. In this case, the subassembly 28, in an inverted posture, is dipped and cleaned in the cleaning solution 228. Thereby, the particles attaching to the surfaces of the hub 26 and the base member 12, the surfaces being on the side sealed by the top cover, can be efficiently removed.

The subassembly 28 has a complicated shape in which a holes and the like are formed. The ultrasonic cleaning using a relatively low frequency has a large cavitation effect, and hence is suitable for removing particles having a large mass and particles firmly attaching. On the other hand, the ultrasonic cleaning using a relatively high frequency is suitable for removing particles in a hole, etc. Therefore, in the cleaning, the subassembly 28 may be cleaned by irradiating ultrasonic waves having two or more types of frequencies, in the cleaning solution 228 made of purified water.

For example, an ultrasonic wave having a relatively low frequency and that having a relatively high frequency are selected as the ultrasonic waves to be used from ultrasonic waves having a frequency of approximately 40 KHz to 200 KHz. By performing the ultrasonic cleaning using the ultrasonic waves having at least two types of high and low frequencies, the particle having a large mass and the particles having a small mass in a hole, etc., can be removed.

Specifically, in the cleaning, the ultrasonic generator 230 generating ultrasonic waves of 40 KHz, that 231 generating ultrasonic waves of 68 KHZ and that 232 generating ultrasonic waves of 132 KHz, are arranged near the bottom of the cleaning tank 226. Each of the ultrasonic generators 230, 231 and 232 performs ultrasonic cleaning on the subassembly 28 that is being conveyed. Thereby, the particles adhering to the subassembly 28 and having different sizes from each other, can be efficiently removed. Also, by concurrently performing ultrasonic cleaning on the subassembly 28 with the use of ultrasonic waves having different frequencies from each other in the same cleaning tank 226, vibrations due to the ultrasonic waves occur in the cleaning solution 228. As a result, the surface of the subassembly 28 can be cleaned uniformly. Furthermore, space efficiency can be improved and a cost for the facility can be suppressed in comparison with the case where the cleaning tanks are separated for every frequency of the ultrasonic cleaning.

Small particles often adhere to the surface of the subassembly 28 in the shadows of large particles. In this case, it is preferable that the large particles are removed at first, in order to efficiently remove the small particles. Therefore, in the cleaning, a frequency of the ultrasonic wave exerted on the subassembly 28 at a period before the cleaning is ended, may be higher than that of the ultrasonic wave exerted thereon at a period when the cleaning is initiated. Thereby, large particles are removed at first, allowing particles having different sizes from each other to be efficiently removed.

Hydrocarbon particles having low affinity with purified water often adhere to the surface of the subassembly 28. Therefore, the cleaning may include an alkali cleaning step in which the subassembly 28 is irradiated with a ultrasonic wave in the cleaning solution 228 made of alkali ion water. As a result, the hydrocarbon particles can be efficiently removed by the cleaning using the alkali ion water. Because the alkali ion water has many minus ions, the water well reacts with the hydrocarbon particles. Also, because the alkali ion water has a low surface tension, the water infiltrates into the inside of a hole, etc., formed in the subassembly 28, allowing an effect of removing particles different from what are removed by the purified water to be demonstrated.

The effect of removing the particles different from what are removed by the purified water can be expected when using the alkali ion water having a pH (power of the Hydrogen) equal to or higher than 10. Also, when solubility of air into the alkali ion water is equal to or lower than 5%, a cleaning effect by the ultrasonic waves can be improved. When the solubility of air thereinto is equal to or higher than 2%, the alkali ion water can be easily produced.

When cleaning the subassemblies 228 one after another in the cleaning solution 228, the particles that have detached therefrom float in the cleaning solution 228. There is a challenge that the floating particles reattach to the subassembly 28 to decrease the cleaning effect. To deal with the challenge, in the cleaning, the subassembly 28 may be cleaned while being conveyed in the cleaning solution 228, and the cleaning solution 228 may be flowing toward the direction opposite to that of the subassembly 28 being conveyed. In this case, it may be possible that a plurality of the subassemblies 28 are not placed in the cleaning solution 228 at a time, in the cleaning.

Specifically, in the cleaning, a pump (not illustrated) that pumps the cleaning solution 228 is provided at the end portion L of the cleaning tank 226, the end portion L being on the side where the subassembly 28 is put therein. Foreign substances such as particles floating in the cleaning solution 228 pumped by the pump, are removed by a filter and discharged from a discharge nozzle (not illustrated) provided at the end portion R of the cleaning tank 226, the end portion R being on the side where the subassembly 28 is taken out. A water flow flowing toward the direction opposite to that of the subassembly 28 being conveyed, occurs in the cleaning tank 226 by this purification treatment. Accordingly, the particles removed from the subassembly 28 are moved away from the subassembly 28 by the water flow and removed by the filter. As a result, a possibility that the particles may reattach to the subassembly 28 can be reduced.

Figure 7:
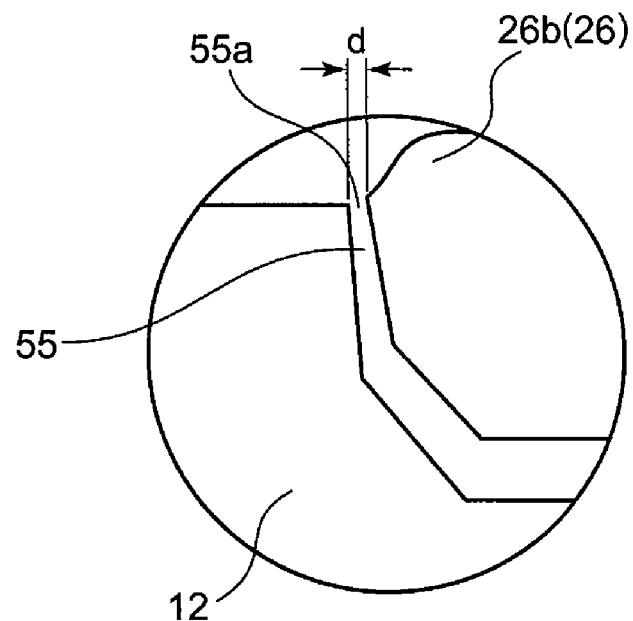
FIG. 7 is a magnified cross-sectional view illustrating part of the subassembly according to the embodiment.

FIG. 7 is a magnified cross-sectional view illustrating part of the subassembly 28 according to the embodiment. The subassembly 28 has a circular gap 55 opened outwards between the base member 12 and the hub 26. The gap 55 is formed with the outer circumferential surface of the outward extension portion 26b of the hub 26 and the surface of the base member 12 opposing thereto. The cleaning solution 228 enters the inside of the subassembly 28 from the gap 55 between the base member 12 and the hub 26, and remains in the gap 55. There is a challenge that the cleaning solution 228 remaining there oxidizes the surfaces of the base member 12 and the hub 26, causing particles to attach thereto. On the other hand, when cleaning the subassembly 28 with the cover member 50 being fixed, there is a challenge that it is a complicated operation to fix or remove the cover member 50. To deal with these challenges, the gap 55 is formed into a shape such that purified water is prevented from entering the inside of the subassembly 28 from the gap 55 when the subassembly 28 is dipped in the purified water with the gap 55 on the side opened outwards being located downwards. Thereby, an amount of the purified water entering from the gap 55 between the base member 12 and the hub 26 can be reduced even when the cover member 50 is not fixed.

For example, the subassembly 28 is cleaned in a way such that a clearance d of the open end 55a of the gap 55 and a water depth h at which the open end 55a of the gap 55 is located when the subassembly 28 is placed in the purified water, satisfy the following condition. It is assumed that a pressure difference at the air-liquid interface between a purified water pressure at the open end 55a and an inner pressure of the subassembly 28, is Δp. The pressure difference Δp is represented by the following equation (1) from the Laplace equation:

$$\Delta p = 2 \times T/r \quad (1)$$

where r is a meniscus radius, and T is the surface tension of purified water.

Herein, the clearance d of the open end 55a is minute, and hence the meniscus radius r is approximated by half the clearance d. Therefore, the pressure difference is represented by the following equation (2):

$$\Delta p \approx 4 \times T/d \quad (2).$$

The pressure difference Δp at the air-liquid interface of the gap 55 corresponds to the purified water pressure, and is represented by the following equation (3):

$$\Delta p = g \times h \times 1000 (N/m^2) \quad (3)$$

where h is a water depth of the open end 55a and g is the acceleration of gravity.

By rearranging the equations (2) and (3) and substituting g=9.8 (m/s$^2$) and T=0.072 (N/m) thereinto, the condition of the clearance d required for preventing the purified water from entering the gap 55, is represented by the following equation (4):

$$d \times h \leq 0.000029 \ (m^2) \quad (4).$$

For example, when cleaning the subassembly 28 at a water depth h of 0.1 (m), an amount of the purified water entering from the gap 55 between the base member 12 and the hub 26 becomes small if the clearance d is equal to or narrower than 0.29 mm.

In addition, the clearance d and the water depth h may be set so as to satisfy the condition of the equation (5), taking variation factors such as vibration and increase in temperature into consideration. With this, the amount of the purified water entering the gap 55 can be reduced to a lower level:

$$d \times h \geqq 0.000015 \ (m^2) \qquad (5).$$

Also, the gap 55 formed by the base member 12 and the hub 26 may be formed into a tapered shape in which the gap 55 is progressively narrower toward the opened outside. Thereby, even if the cleaning solution 228 enters the gap 55, further entrance of the cleaning solution 228 can be suppressed by a capillary force. As a result, a possibility that the cleaning solution 228 may enter the inside can be reduced.

Cleanness of the disk drive device 10 is evaluated by the number of particles having a size equal to or larger than 0.5 μm per 1 cm² (hereinafter, referred to as LPC). For example, the LPC is obtained by counting the number of particles existing in purified water, after a sample is dipped in a water tank filled with 2000 cc of the purified water such that ultrasonic waves having a frequency of 68 KHz and a power of 98 W are irradiated thereon for 120 seconds. For counting the number of the particles, a liquid particle counter such as CLS-700 or LS 200 (made by Particle Measuring Systems, Inc., U.S.A) is used.

Figure 8:
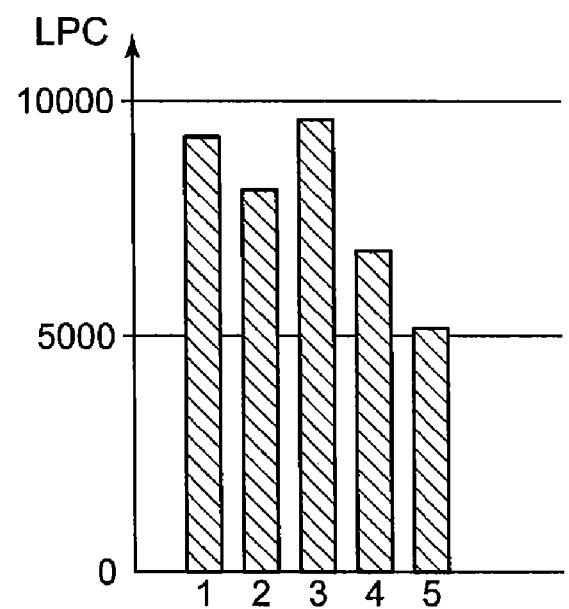
FIG. 8 is a diagram for illustrating cleanness of a disk drive device manufactured by a conventional manufacturing method.
Figure 9:
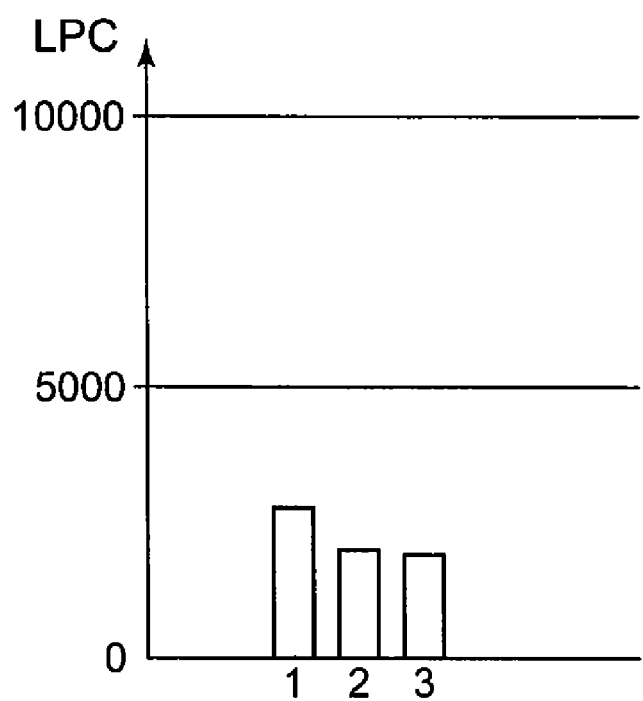
FIG. 9 is a diagram for illustrating cleanness of the disk drive device manufactured by the method of manufacturing the disk drive device according to the embodiment.

FIG. 8 illustrates cleanness of a disk drive device manufactured by a conventional manufacturing method. FIG. 9 illustrates that of the disk drive device 10 manufactured by the manufacturing method of the disk drive device 10 according to the embodiment. The cleanness of the disk drive devices in FIGS. 8 and 9 is represented by the LPC.

The LPCs in five samples of the conventional disk drive devices, illustrated in FIG. 8, are varied between 5000 to 10000 pieces, reflecting that it is difficult to stably maintain the numbers at 8000 pieces or fewer. In contrast, from the LPCs in three samples of the disk drive devices 10 manufactured by the manufacturing method according to the embodiment, illustrated in FIG. 9, it is understood that the LPCs are reduced to approximately 2000 pieces or fewer and a variation therein is also small.

As stated above, in a disk drive device manufactured by a conventional manufacturing method, the disk drive device having the LPC of approximate 5000 to 10000 pieces, a variation in the number of particles for every device is large. Therefore, it is required to check how many particles exist, in an inspection step for the disk drive devices, requiring much efforts. Also, in the case where a disk drive device having many particles is found, the disk drive device is often used in a state where a rotational speed of the recording disk 20 is lowered to a low level, in order to lower a possibility of the TA failure occurring. This often results in slow reading of data.

In contrast, in the disk drive device 10 manufactured by the manufacturing method of the disk drive device 10 according to the embodiment, the LPC can be reduced to 2000 pieces or fewer. That is, a variation in the number of particles for every device can be suppressed to a lower level. As a result, it is no longer required to use the device in a state where a rotational speed of the recording disk is lowered, allowing a high performance disk drive device to be provided.

In the manufacturing method of the disk drive device 10 according to the embodiment, the LPC in the disk drive device 10 may be adjusted so as to be 1500 pieces or fewer by extending a cleaning time with the adjustment of a conveying speed of the subassembly 28. Further, the LPC therein may be adjusted so as to be 1000 pieces or fewer by further slowing the conveying speed. It is desirable that such LPC adjustment is performed after comparing a man-hour required for the adjustment of the LPC with its working efficiency, and comparing a man-hour required for removal of the particles with its working efficiency.

In the embodiments, the case where purified water is mostly used as the cleaning solution 228 has been described, but other cleaning solutions can be used.

In the embodiments, the shaft-rotation-type disk drive device 10 is described as an example of the disk drive device 10. However, the manufacturing method according to the present invention can also be used for disk drive devices having different structures therefrom such as a shaft-fixed-type disk drive device, etc, in which the same effect as the embodiments can be acquired.

The present invention should not be limited to the aforementioned embodiments, and an appropriate combination of each element of the above embodiments is effective as an embodiment of the invention. Further, various modifications, such as design modifications, can be made with respect to the above embodiments based on the knowledge of those skilled in the art, and an embodiment with such a modification should fall within the scope of the present invention. The structure illustrated in each drawing is intended to exemplify an example, and the structure can be appropriately modified to a structure having a similar function, which can provide similar effects.

What is claimed is:

1. A method of manufacturing a disk drive device comprising:
   assembling a subassembly by fixing at least a bearing unit, a drive unit and a hub to a base member in a first clean room;
   cleaning the subassembly in a second clean room; and
   sealing the subassembly by a sealing member,
   wherein the first clean room and the second clean room are communicated with each other by a communicating opening for transferring the subassembly, and wherein an atmospheric pressure in the second clean room is equal to or higher than that in the first clean room.

2. The method of claim 1, further comprising drying the subassembly while heating, between the cleaning and the sealing.

3. The method of claim 1, further comprising confirming whether the subassembly has a void, between the cleaning and the sealing.

4. The method of claim 1, further comprising confirming a resistance value of a coil of the drive unit, between the cleaning and the sealing.

5. The method of claim 1, wherein the cleaning includes cleaning the subassembly by blowing a mixture of purified water and air against the subassembly.

6. The method of claim 1, wherein, in the cleaning, the subassembly is cleaned while being placed in a cleaning solution.

7. The method of claim 6, further comprising fixing a removable cover member to a gap between the base member and the hub, before the cleaning.

8. The method of claim 7, wherein the cover member is made of a resin material.

9. The method of claim 7, wherein the cover member is an elastic body.

10. The method of claim 8, wherein, in the fixing in which the cover member is fixed, a liquid resin is applied to the gap between the base member and the hub, and thereafter is cured.

11. The method of claim 10, wherein the liquid resin is cured by ultraviolet irradiation.

12. The method of claim 6, wherein, in the cleaning, the subassembly is cleaned by ultrasonic wave irradiation.

13. The method of claim 12, wherein, in the cleaning, the subassembly is cleaned by irradiating ultrasonic waves having two or more types of frequencies, in the cleaning solution made of purified water.

14. The method of claim 13, wherein, in the cleaning, a frequency of the ultrasonic wave exerted on the subassembly at a period before the cleaning is ended, is higher than that of the ultrasonic wave exerted thereon at a period when the cleaning is initiated.

15. The method of claim 12, wherein, the cleaning includes a step in which the subassembly is cleaned by irradiating a ultrasonic wave in the cleaning solution made of alkali ion water.

16. The method of claim 6, wherein, in the cleaning, the subassembly is cleaned while being conveyed in the cleaning solution, and the cleaning solution is flowing toward the direction opposite to that of the subassembly being conveyed.

* * * * *